US011489160B2

(12) United States Patent
Kim et al.

(10) Patent No.: US 11,489,160 B2
(45) Date of Patent: Nov. 1, 2022

(54) ANODE ACTIVE MATERIAL INCLUDING CARBON COMPOSITE FOR LITHIUM SECONDARY BATTERY AND METHOD OF MANUFACTURING THE SAME

(71) Applicant: THE INDUSTRY & ACADEMIC COOPERATION IN CHUNGNAM NATIONAL UNIVERSITY (IAC), Daejeon (KR)

(72) Inventors: Chunjoong Kim, Daejeon (KR); Sung-Man Lee, Gyeonggi-do (KR)

(73) Assignee: THE INDUSTRY & ACADEMIC COOPERATION IN CHUNGNAM NATIONAL UNIVERSITY (IAC), Daejeon (KR)

( * ) Notice: Subject to any disclaimer, the term of this patent is extended or adjusted under 35 U.S.C. 154(b) by 86 days.

(21) Appl. No.: 17/139,286

(22) Filed: Dec. 31, 2020

(65) Prior Publication Data

US 2022/0190335 A1 Jun. 16, 2022

(30) Foreign Application Priority Data

Dec. 10, 2020 (KR) .......................... 10-2020-0172569

(51) Int. Cl.
*H01M 4/583* (2010.01)
*H01M 4/02* (2006.01)

(52) U.S. Cl.
CPC ...... *H01M 4/583* (2013.01); *H01M 2004/021* (2013.01)

(58) Field of Classification Search
CPC .................. H01M 4/583; H01M 2004/021
See application file for complete search history.

(56) References Cited

U.S. PATENT DOCUMENTS

| 9,905,848 | B2 | 2/2018 | Ko et al. |
| 10,377,634 | B2 | 8/2019 | Sotowa et al. |
| 2019/0123356 | A1 | 4/2019 | Ko et al. |

FOREIGN PATENT DOCUMENTS

| KR | 1020170054865 | 5/2017 |
| KR | 101971448 | 4/2019 |

(Continued)

*Primary Examiner* — Jane J Rhee
(74) *Attorney, Agent, or Firm* — Burris Law, PLLC (57) ABSTRACT

An anode active material contains a carbon composite, and the carbon composite may include a core particle including hard carbon and a skin layer placed on a surface of the core particle. The skin layer includes graphite particles attached to the surface of the core particle at a predetermined angle with respect to the surface and the graphite particles include graphite-based carbon material. The skin layer further includes an amorphous carbon layer filling a space between the graphite particles and attaching the graphite particles to the surface of the core particle. The carbon composite has a ratio of $I_D$ to $I_G$ in a range of 0.8 to 1.5 ($0.8 \leq I_D/I_G \leq 1.5$) in Raman analysis where $I_D$ is the intensity of D peak at 1300 $cm^{-1}$ to 1400 $cm^{-1}$ and $I_G$ is the intensity of G peak at 1500 $cm^{-1}$ to 1600 $cm^{-1}$.

10 Claims, 10 Drawing Sheets

(56) References Cited

FOREIGN PATENT DOCUMENTS

KR 1020190043955 4/2019
WO WO-2017099456 A1 * 6/2017 .......... H01M 10/052

* cited by examiner

ANODE ACTIVE MATERIAL INCLUDING CARBON COMPOSITE FOR LITHIUM SECONDARY BATTERY AND METHOD OF MANUFACTURING THE SAME

CROSS-REFERENCE TO RELATED APPLICATION

This application is based on and claims priority under 35 U.S.C. § 119 to Korean Patent Application No. 10-2020-0172569, filed on Dec. 10, 2020, in the Korean Intellectual Property Office, the disclosure of which is incorporated by reference herein in its entirety.

FIELD

One or more embodiments relates to an anode active material for a lithium secondary battery and a method of manufacturing the same, more particularly, to an anode active material including a carbon composite for a lithium secondary battery and a method of manufacturing the same.

BACKGROUND

Recently, as the demand for using lithium ion batteries in various applications such as small mobile devices and electric vehicles increases, there is a need to optimize the performance of lithium ion batteries according to various requirements for various application fields. In particular, for use in electric vehicles or energy storage systems (ESS), the development of active materials capable of fast charging and having high capacity is required.

The widely used graphite-based anode active material has high capacity and excellent cycle characteristics, but may have relatively low high-rate characteristics due to the layered crystal structure of graphite. Amorphous hard carbon is being studied as a candidate material for an anode active material capable of fast charging. Although amorphous hard carbon exhibits relatively excellent high rate characteristics, the amorphous hard carbon has a difficult problem in commercialization as a negative electrode active material of a lithium secondary battery in that it exhibits a relatively low capacity due to an amorphous crystal structure.

SUMMARY

One or more embodiments include an anode active material for a lithium secondary battery including a carbon composite having high capacity and excellent high rate characteristics.

One or more embodiments include a method of manufacturing an anode active material for a lithium secondary battery including a carbon composite having high capacity and excellent high rate characteristics.

Additional aspects will be set forth in part in the description which follows and, in part, will be apparent from the description, or may be learned by practice of the presented embodiments of the disclosure.

An anode active material for a lithium secondary battery according to one or more embodiments is an anode active material including a carbon composite. The carbon composite may include a core particle including hard carbon; and a skin layer placed on a surface of the core particle, wherein the skin layer includes graphite particles attached to the surface of the core particle at a predetermined angle with respect to the surface and including graphite-based carbon material; and an amorphous carbon layer filling a space between the graphite particles and attaching the graphite particles to the surface of the core particle, and the carbon composite has a ratio of $I_D$ to $I_G$ in a range of 0.8 to 1.5 ($0.8 \leq I_D/I_G \leq 1.5$) in Raman analysis where $I_D$ is the intensity of D peak at 1300 cm$^{-1}$ to 1400 cm$^{-1}$ and $I_G$ is the intensity of G peak at 1500 cm$^{-1}$ to 1600 cm$^{-1}$.

In an embodiment, 50% by weight or more of the graphite particles based on the total weight of the graphite particles may be attached at an angle of 20° to 90° with respect to the surface of the core particle.

In an embodiment, the carbon composite may exhibit a surface morphology that is not smooth by the graphite particles.

In an embodiment, based on the weight of the carbon composite, the core particle may be included in 30% by weight to 50% by weight, the graphite particles are included in 40% by weight to 60% by weight, and the amorphous carbon layer may be included in 10% by weight to 30% by weight.

In an embodiment, the carbon composite may have a particle diameter having a median value (D0.5) of about 10 μm to about 30 μm.

An anode active material for a lithium secondary battery according to one or more embodiments is an anode active material including a carbon composite. The carbon composite may include a core particle including hard carbon; a skin layer placed on a surface of the core particle, wherein the skin layer may include graphite particles attached to the surface of the core particle and including graphite-based carbon material; and an amorphous carbon layer filling a space between the graphite particles and attaching the graphite particles to the surface of the core particle, the carbon composite has a ratio of $I_D$ to $I_G$ in a range of 0.8 to 1.5 ($0.8 \leq I_D/I_G \leq 1.5$) in Raman analysis where $I_D$ is the intensity of D peak at 1300 cm$^{-1}$ to 1400 cm$^{-1}$ and $I_G$ is the intensity of G peak at 1500 cm$^{-1}$ to 1600 cm$^{-1}$, and 50% by weight or more of the graphite particles based on the total weight of the graphite particles are attached at an angle of about 20° to about 90° with respect to the surface of the core particle.

In an embodiment, the carbon composite may exhibit a surface morphology that is not smooth by the graphite particles.

In an embodiment, based on the weight of the carbon composite, the core particle is included in 30% by weight to 50% by weight, the graphite particles may be included in 40% by weight to 60% by weight, and the amorphous carbon layer may be included in 10% by weight to 30% by weight.

In an embodiment, the carbon composite may have a particle diameter having a median value (D0.5) of about 10 μm to about 30 μm.

In an embodiment, the carbon composite may have a BET specific surface area of about 2 m$^2$/g to about 8 m$^2$/g.

The anode electrode active material for a lithium secondary battery according to one or more embodiments includes graphite particles attached to a core particle including amorphous hard carbon at a predetermined angle. Therefore, while high discharge capacity is obtained by the graphite particles, the movement path of lithium ions from the outside of the carbon composite to the core particle may be reduced compared to the case where the graphite particles completely surround the core particle, and accordingly, it may exhibit a high capacity even in fast charging and discharging. Accordingly, the anode active material for a lithium secondary battery may have high capacity and excellent high rate characteristics.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In order to fully understand the configuration and effects of the embodiments, preferred embodiments of the present disclosure will be described with reference to the accompanying drawings. However, the present disclosure is not limited to the embodiments disclosed below, and may be implemented in various forms and various modifications may be made. However, the description of the embodiments is provided to complete the disclosure of the present disclosure, and to completely inform the scope of the invention to those of ordinary skill in the art to which the present disclosure belongs. In the accompanying drawings, the size of the elements is enlarged from the actual size for convenience of explanation, and the ratio of each element may be exaggerated or reduced.

When an element is described as being "on" or "adjacent to" another element, it should be understood that it may be directly in contact with or connected to another element, but another element may exist between them. On the other hand, when an element is described as being "directly above" or "in direct contact with" another element, it may be understood that another element does not exist between them. Other expressions describing the relationship between elements, such as "between" and "directly between," may be interpreted above described as well.

Terms such as first and second may be used to describe various elements, but the elements should not be limited by the terms. The terms may be used only for the purpose of distinguishing one element from another element. For example, without departing from the scope of the present disclosure, a first element may be referred to as a second element, and similarly, a second element may be referred to as a first element.

An expression used in the singular encompasses the expression of the plural, unless the context clearly indicates otherwise. Terms such as "include" or "have" are intended to designate the presence of features, numbers, steps, operations, elements, parts, or combinations thereof described in the specification, and it may be construed that one or more other features or numbers, steps, operations, elements, parts, or combinations thereof may be added.

Terms used in the embodiments of the present disclosure may be interpreted as meanings commonly known to those of ordinary skill in the art, unless otherwise defined.

Hereinafter, the present disclosure will be described in detail by describing a preferred embodiment of the present disclosure with reference to the accompanying drawings.

Figure 1:
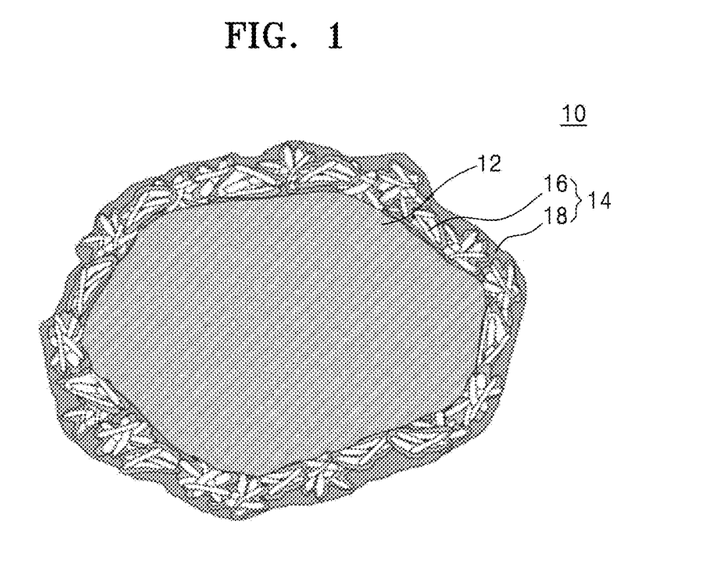
FIG. 1 is a schematic diagram illustrating a carbon composite of an anode active material for a lithium secondary battery according to an embodiment.

FIG. 1 is a schematic diagram illustrating a carbon composite 10 of an anode active material for a rechargeable lithium battery according to an embodiment.

Referring to FIG. 1, the anode active material for a lithium secondary battery may include particles made of a carbon composite 10. A conductive material and a binder are mixed with the anode active material including the carbon composite 10 to be used as an anode electrode (or a negative electrode).

The carbon composite 10 includes a core particle 12 and a skin layer 14 surrounding the core particle 12. The skin layer 14 may include graphite particles 16 attached to the surface of the core particle 12 and an amorphous carbon layer 18 covering the graphite particles 16 and surrounding the surface of the core particle 12.

In an embodiment, the core particle 12 may include hard carbon. The core particle 12 may include amorphous hard carbon. For example, the amorphous hard carbon may refer to a material that does not change into crystalline graphite even when heat-treated at a temperature equal to or greater than the graphitization temperature. Since the amorphous hard carbon has a plurality of edge sites therein, lithium ions may cause an electrochemical reaction at these edge sites, and a smooth reaction of lithium ions may occur even at a relatively high current density. The amorphous hard carbon enables stable operation at high current densities or at low temperatures. For example, the core particle 12 may be included in an amount of about 30% by weight to about 50% by weight based on the total weight of the carbon composite 10.

In an embodiment, the skin layer 14 may cover the surface of the core particle 12 and may include the graphite particles 16 and the amorphous carbon layer 18. For example, the skin layer 14 may have a thickness of about 10% to about 30% with respect to the diameter of the core particle 12, and may be placed in a non-conformal placement depending on a relatively random orientation of the graphite particles 16 arranged in the skin layer 14. For example, the thickness of the skin layer 14 surrounding one core particle 12 may not be uniform. That is, the thickness of the skin layer 14 placed on a portion of the core particle 12 may be different from the thickness of the skin layer 14 placed on another portion of the core particle 12.

The graphite particles 16 may be attached to the surface of the core particle 12 at a predetermined angle with respect to the surface. For example, the graphite particles 16 may have a plate shape or a flake shape, and the flake shape may mean a two-dimensional shape having a relatively thin thickness in a thickness direction and extending in a length direction. The graphite particles 16 may be artificial graphite or a mixture of artificial graphite and natural graphite. When the graphite particles 16 are a mixture of artificial graphite and natural graphite, the content of natural graphite may be 50% or less of the weight of the mixture.

In an embodiment, the graphite particles 16 may be attached at an angle of about 20° to about 90° from the surface of the core particle 12. In some examples, 30% by weight or more of the graphite particles 16 based on the total weight of the graphite particles 16 may be attached at an angle of about 10° to about 90° with respect to the surface of the core particle 12. For example, 50% by weight or more of the graphite particles 16 based on the total weight of the graphite particles 16 may be attached at an angle of about 20° to about 90° with respect to the surface of the core particle 12. Some of the graphite particles 16 are placed substantially vertically on the surface of the core particle 12 so that one end of each of the graphite particles 16 contacts the surface of the core particle 12 and the other end of each of the graphite particles 16 may be placed to be spaced apart from the core particle 12.

As the graphite particles 16 are attached to the surface of the core particle 12 at a relatively large inclination angle, a relatively large amount of graphite particles 16 may be placed to surround the surface of the core particle 12. For example, the graphite particles 16 may be included in the carbon composite 10 with about 40% by weight to about 60% by weight based on the total weight of the carbon composite 10.

The amorphous carbon layer 18 may surround the graphite particles 16, fill a space between the graphite particles 16, and attach the graphite particles 16 to the surface of the core particle 12. The amorphous carbon layer 18 may be included in the carbon composite 10 with about 10% by weight to about 30% by weight based on the total weight of the carbon composite 10. For example, the amorphous carbon layer 18 may include an amorphous carbon material formed by carbonizing a pitch-based carbon precursor by heat treatment, but the precursor material of the amorphous carbon layer 18 is not limited to a pitch-based carbon precursor.

In an embodiment, the carbon composite 10 may have a particle size of about 50 μm or less. In addition, the carbon composite 10 may have a particle size having a median value (D0.5) of about 10 μm to about 30 μm. In some examples, the carbon composite 10 may have a particle size having a median value (D0.5) of about 15 μm to about 25 μm, but is not limited thereto. In an embodiment, the carbon composite 10 may have a BET specific surface area of about 2 $m^2/g$ to about 8 $m^2/g$.

In an embodiment, the carbon composite 10 has a ratio of $I_D$ to $I_G$ in a range of 0.8 to 1.5 ($0.8 \leq I_D/I_G \leq 1.5$) in Raman analysis where to $I_D$ is the intensity of the D peak at 1300 $cm^{-1}$ to 1400 $cm^{-1}$ and $I_G$ is the intensity of the G peak at 1500 $cm^{-1}$ to 1600 $cm^{-1}$. As the carbon composite 10 includes graphite particles 16 attached to the surface of the core particle 12 at a relatively large inclination angle, the intensity $I_D$ of the D peak of the carbon composite 10 may be relatively large, accordingly, the ratio of $I_D$ to $I_G$ may be indicated that the ratio of $I_D$ to $I_G$ is in the range of 0.8 to 1.5.

The anode active material including the carbon composite 10 according to an embodiment includes graphite particles attached at a predetermined angle to core particle including amorphous hard carbon. Therefore, while high discharge capacity is obtained by the graphite particles, the movement path of lithium ions from the outside of the carbon composite to the core particle may be reduced compared to the case where the graphite particles completely surround the core particle, and accordingly, it may exhibit a high capacity even in fast charging and discharging. Accordingly, the anode active material for a lithium secondary battery may have high capacity and excellent high rate characteristics.

Figure 2:
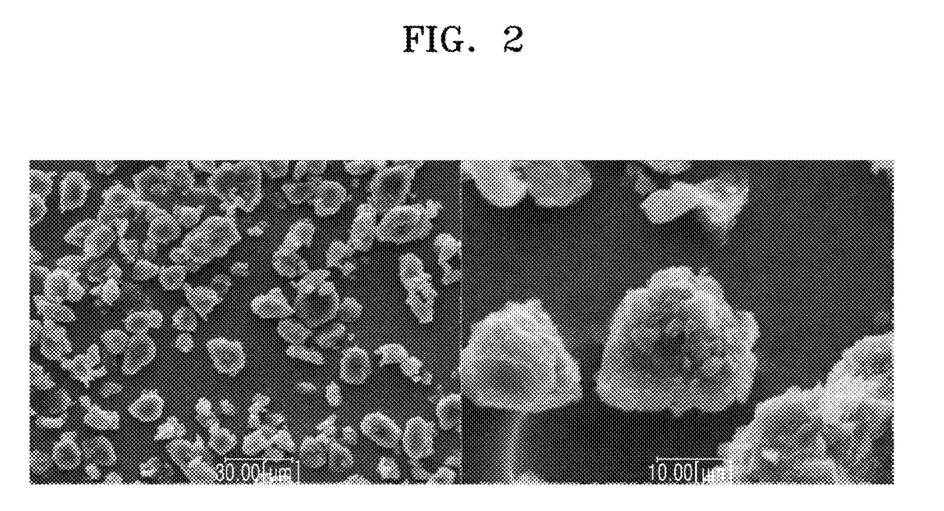
FIG. 2 is a scanning electron microscope (SEM) image of a carbon composite of an anode active material for a lithium secondary battery according to an embodiment.

FIG. 2 is a scanning electron microscope (SEM) image of a carbon composite 10 of an anode active material for a lithium secondary battery according to an embodiment.

Referring to FIG. 2, it may be seen that the carbon composite 10 has a particle diameter of about 10 μm to about 30 μm and a relatively uniform particle size distribution. It may be seen that the carbon composite 10 has a spherical or hemispherical particle shape, and each of the carbon composites 10 exhibits a non-smooth surface morphology. As described with reference to FIG. 1, it may be assumed that this is a surface morphology that appears because the graphite particle 16 attach to the surface of the core particle 12 at a relatively large inclination angle.

Figure 3:
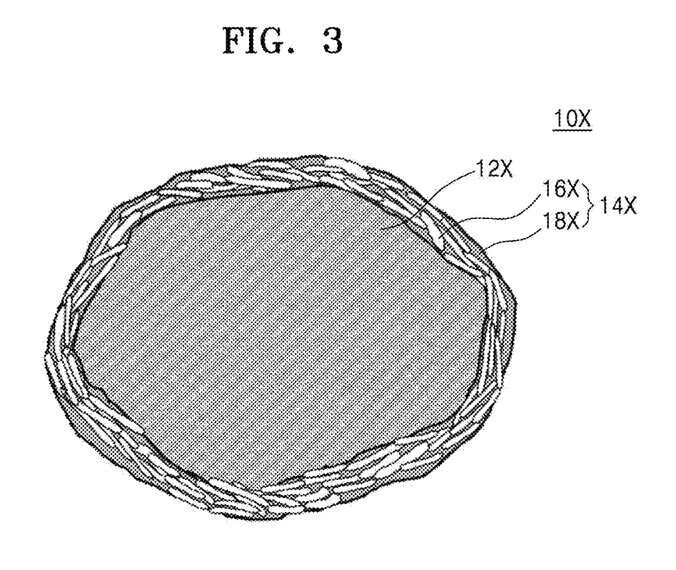
FIG. 3 is a schematic diagram showing a carbon composite of an anode active material for a lithium secondary battery according to Comparative Example.
Figure 4:
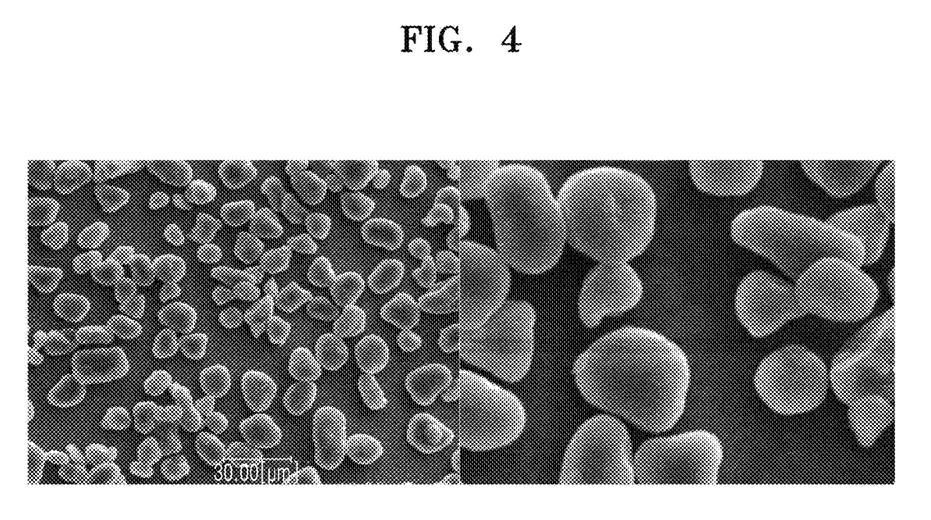
FIG. 4 is a scanning electron microscope (SEM) image of a carbon composite of an anode active material for a lithium secondary battery according to Comparative Example.

FIG. 3 is a schematic diagram showing a carbon composite 10X of an anode active material for a lithium secondary battery according to Comparative Example, and FIG. 4 is a scanning electron microscope (SEM) image of a carbon composite 10X of an anode active material for a lithium secondary battery according to Comparative Example.

Referring to FIGS. 3 and 4, the carbon composite 10X includes a core particle 12X and a skin layer 14X surrounding the core particle 12X. The skin layer 14X may include graphite particles 16X attached to the surface of the core particle 12X, and an amorphous carbon layer 18X covering the graphite particles 16X and surrounding the surface of the core particle 12X.

The graphite particles 16X may be placed at a relatively small angle with respect to the surface of the core particle 12X. For example, the graphite particles 16X placed in the skin layer 14X are regularly arranged in a direction substantially parallel to the surface of the core particle 12X, and the graphite particles 16X may surround the surface of the core particle 12X. Accordingly, the thickness of the skin layer 14X surrounding one core particle 12X may be relatively uniform.

As shown in FIG. 4, it may be seen that the carbon composite 10X has a particle diameter of about 10 μm to about 30 μm and a relatively uniform particle size distribution. It may be seen that the carbon composite 10X has a spherical or hemispherical particle shape, and each carbon composite 10X exhibits a smooth surface morphology. As described with reference to FIG. 3, it may be assumed that this is a surface morphology that appears because the graphite particles 16X are arranged in a direction parallel to the surface of the core particle 12X and attach to the surface of the core particle 12X.

Hereinafter, a method of manufacturing a carbon composite according to an embodiment described with reference to FIGS. 1 and 2 will be described.

First, hard carbon, graphite powder, and a pitch-based carbon material are mixed, and a mechanical shearing force is applied to the mixture to form a carbon composite.

In embodiment, a process for forming the carbon composite may be a mechanofusion process, a ball milling process, a high energy ball milling process, a mechanical alloying process, and the like. For example, in the case of forming a carbon composite using a mechanofusion process, graphite particles surround the core particle, which are hard carbon, as mechanical shearing force is applied at a temperature equal to or higher than the softening point of hard carbon, while a carbon composite having a structure in which the pitch-based carbon material surrounds the surfaces of the core particle and the graphite particles may be formed. Meanwhile, the inclination angle between the graphite particles and the surface of the core particle may be determined by appropriately controlling the mechanical shearing force in the mechanofusion process. For example, graphite particles may be attached to be arranged in a direction substantially parallel to the surface of the core particle as shown in FIGS. 3 and 4 according to the process temperature and the magnitude of the mechanical shearing force in the mechanofusion process, or as shown in FIGS. 1 and 2, graphite particles may be attached to the surface of the core particle to be arranged at a relatively large inclination angle.

In embodiment, based on the weight of the total mixture, hard carbon is mixed at about 30 to 50% by weight, graphite powder is mixed at about 40 to about 60% by weight, and pitch-based carbon material is mixed at about 10% by weight to about 30% by weight.

Thereafter, the carbon composite may be selectively heat treated. In an embodiment, the heat treatment may be performed at a temperature of about 500° C. to about 2000° C. The heat treatment may be performed in an atmosphere using nitrogen, hydrogen, argon, or a combination thereof, but is not limited thereto. For example, a pitch-based carbon material may be carbonized by the heat treatment to form the skin layer covering at least a portion of the graphite particles and surrounding the surface of the core particle.

Hereinafter, physical properties of the carbon composite according to an embodiment and the electrochemical performance evaluation of an anode electrode including the carbon composite will be discussed in detail with reference to FIGS. 5 to 11E.

Figure 5:
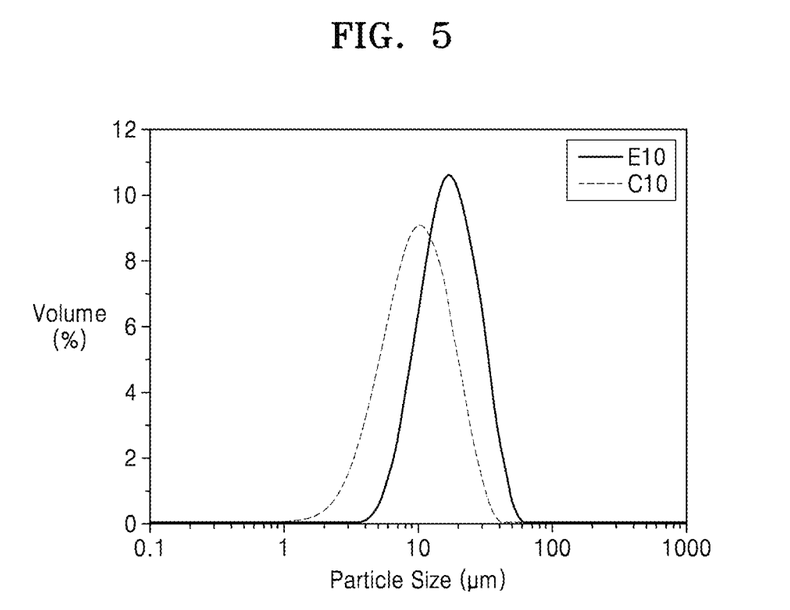
FIG. 5 is a graph showing particle distribution of a carbon composite according to an embodiment.

FIG. 5 is a graph showing particle distribution of a carbon composite according to an embodiment. In FIG. 5, the particle distribution of the carbon composite E10 according to Example is compared with the carbon composite C10 according to Comparative Example.

Referring to FIG. 5, the carbon composite E10 according to Example and the carbon composite C10 according to Comparative Example have maximum peaks at 20 μm and 10 μm, respectively, and have a relatively uniform particle distribution. In particular, it may be seen that the carbon composite E10 according to Example exhibits a larger particle distribution than the carbon composite C10 according to Comparative Example.

Table 1 shows D0.1, D0.5, and D0.9 in particle distributions of the carbon composite E10 according to Example and the carbon composite C10 according to Comparative Example. Here, D0.1 means the particle size at which the cumulative volume becomes 10% in the particle distribution graph of the carbon composite particles, D0.5 means the particle size at which the cumulative volume becomes 50%, and D0.9 means the particle size at which the cumulative volume becomes 90%.

TABLE 1

|  | D0.1(μm) | D0.5(μm) | D0.9(μm) |
|---|---|---|---|
| Comparative Example (C10) | 7.535 | 17.641 | 37.846 |
| Example (E10) | 7.535 | 17.641 | 37.846 |

As shown in Table 1, the carbon composite (E10) according to the Example has a D0.5 (for example, also referred to as a median value) of 21.758 μm, the difference between D0.9 and D0.1 has a value of approximately 34.2 μm. On the other hand, the carbon composite C10 according to Comparative Example has a D0.5 of 17.641 μm, and a difference between D0.9 and D0.1 has a value of approximately 30.3 μm. In particular, it may be seen that the carbon composite E10 according to Example has a larger particle size distribution than the carbon composite C10 according to Comparative Example. This may be considered to be due to the relatively large thickness of the skin layer formed by the core particle as the graphite particles are placed to have a predetermined slope on the surface of the core particle, as shown in FIGS. 1 and 2.

Figure 6:
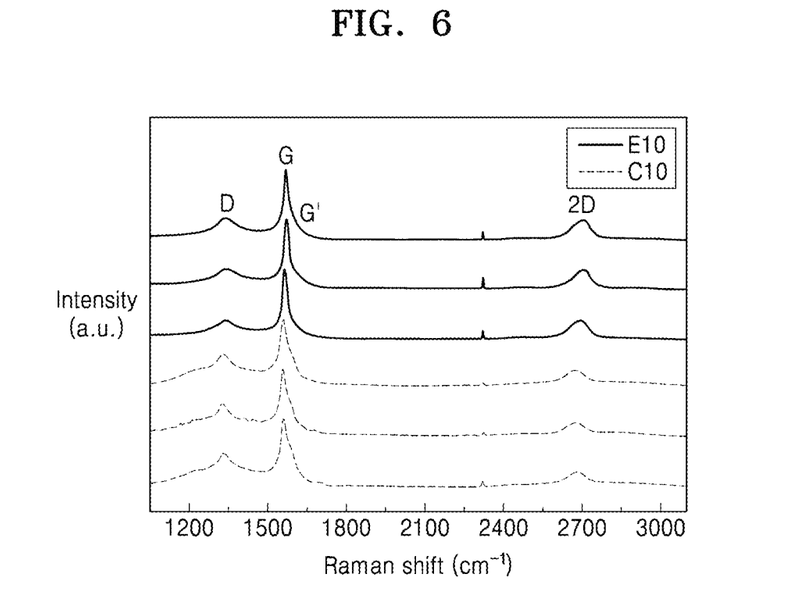
FIG. 6 is a graph showing a Raman spectrum of a carbon composite according to an embodiment.
Figure 7:
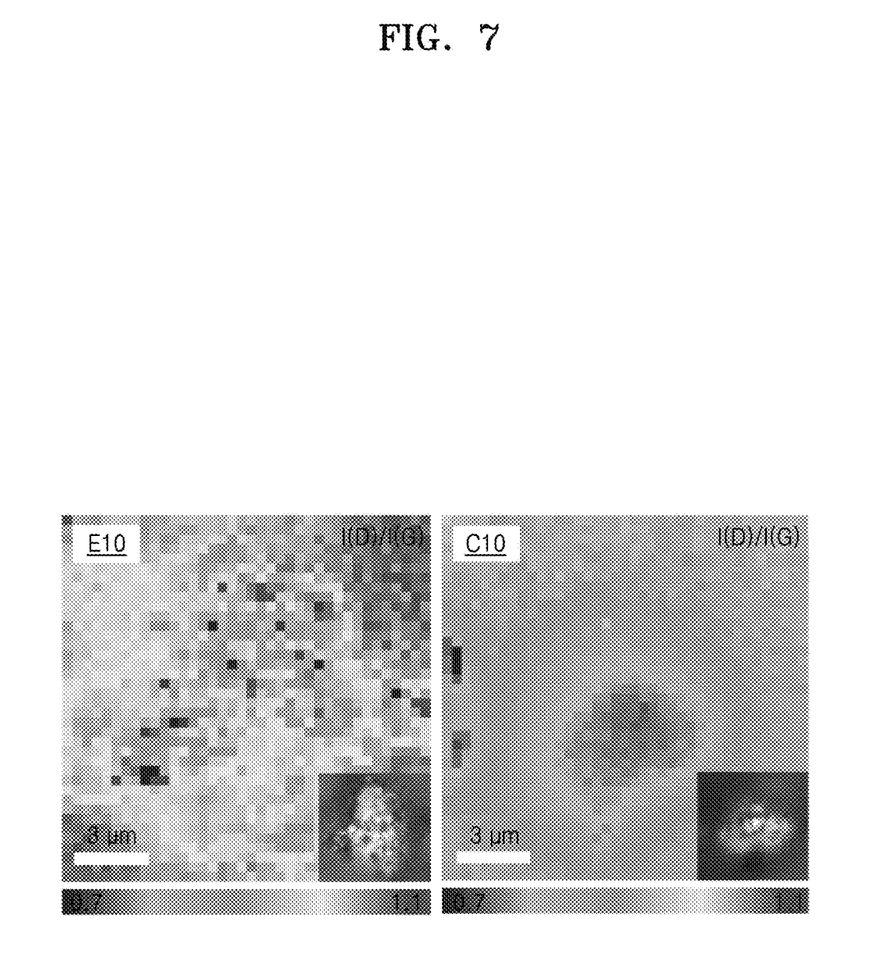
FIG. 7 is a graph in which $I_D/I_G$, which is the intensity of the D peak to $I_G$ which is the intensity of the G peak in the Raman spectrum of FIG. 6, is mapped.

FIG. 6 is a graph showing a Raman spectrum of a carbon composite according to an embodiment. FIG. 7 is a graph in which $I_D/I_G$, which is the intensity of the D peak to $I_G$ which is the intensity of the G peak in the Raman spectrum of FIG. 6, is mapped.

FIG. 6 shows Raman spectra of the carbon composite E10 according to Example and the carbon composite C10 according to Comparative Example. In detail, the carbon composite E10 according to Example and the carbon composite C10 according to Comparative Example exhibit a G peak at 1500 cm$^{-1}$ to 1600 cm$^{-1}$ and a D peak at 1300 cm$^{-1}$ to 1400 cm$^{-1}$.

As Comparative Example, in a carbon material based on a two-dimensional sheet-like structure such as graphene or graphite, the intensity of the G peak is very dominant at 1500 cm$^{-1}$ to 1600 cm$^{-1}$, whereas the D peak is hardly observed at 1300 cm$^{-1}$ to 1400 cm$^{-1}$. That is, when graphite contained in the carbon composite has a two-dimensional regularity, $I_D/I_G$, which is the intensity of the D peak to $I_G$, which is the intensity of the G peak, may be relatively small.

As shown in FIG. 7, it may be seen that the carbon composite C10 according to Comparative Example exhibits a relatively low $I_D/I_G$ of about 0.7 to about 0.8, while the carbon composite E10 according to Example exhibits a relatively high $I_D/I_G$ of about 0.8 to about 1.1. According to the carbon composite C10 according to Comparative Example, a relatively low $I_D/I_G$ value was observed over substantially the entire area of the surface of the carbon composite particle of approximately 15 μm in size. This may be a result obtained because the graphite particles smoothly surround the core particle in a two-dimensional layered structure. On the other hand, according to the carbon composite E10 according to Example, not only a relatively high $I_D/I_G$ value was observed on the surface of the carbon composite particle having a size of about 15 μm, but also a large local fluctuation of the $I_D/I_G$ value is observed on the surface of the carbon composite particle. This may be a result obtained because the graphite particles surrounding the surface of the core particle are placed to have a predetermined inclination angle on the surface of the core particle (or perpendicular to the surface of the core particle).

Figure 8A:
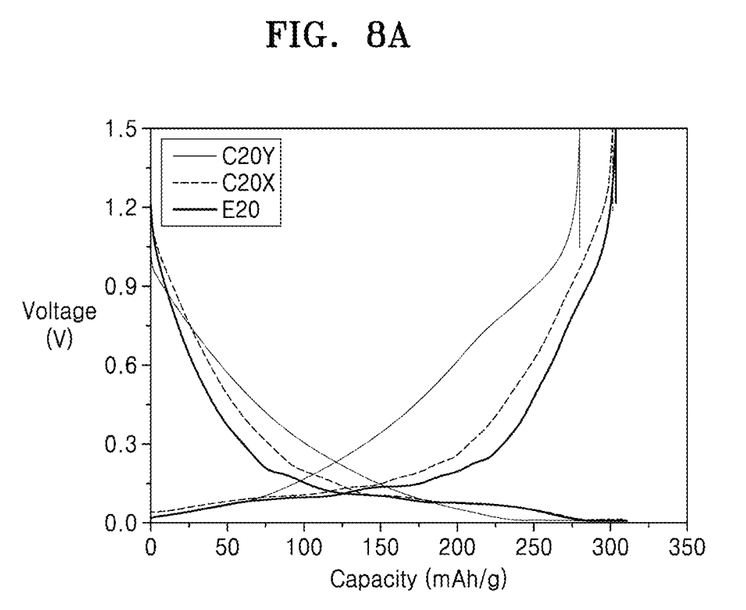
FIG. 8A is a graph showing a charging and discharging profile of an anode electrode (or a negative electrode) including a carbon composite according to an embodiment.
Figure 8B:
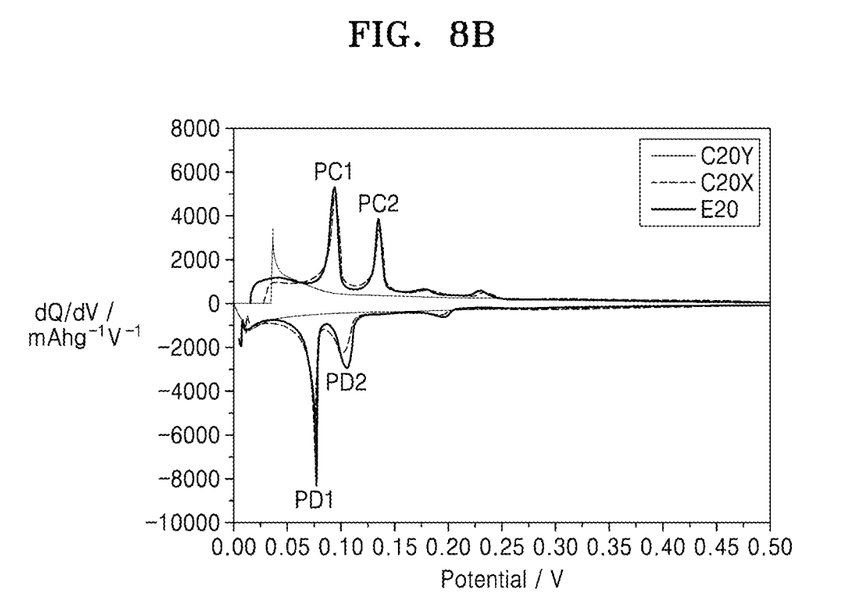
FIG. 8B is a graph plotting dQ/dV values in the charging and discharging profile of FIG. 8A.

FIG. 8A is a graph showing a charging and discharging profile of an anode electrode including a carbon composite according to an embodiment. FIG. 8B is a graph plotting dQ/dV values in the charging and discharging profile of FIG. 8A.

FIGS. 8A and 8B show charging and discharging profiles of an anode electrode E20 including a carbon composite according to Example and an anode electrode C20X (Comparative Example 1) including a carbon composite according to Comparative Example, and shows together for comparison, the charging and discharging profiles of the anode electrode C20Y (Comparative Example 2) composed of only core particle including hard carbon together.

TABLE 2

|  | Initial charging capacity (mAh/g) | Initial discharge capacity (mAh/g) | Initial efficiency (%) |
| --- | --- | --- | --- |
| Example (E20) | 352.7 | 305.2 | 86.5 |
| Comparative Example 1 (C20X) | 362.0 | 302.6 | 83.6 |
| Comparative Example 2 (C20Y) | 347.3 | 279.0 | 83.2 |

Referring to FIGS. 8A, 8B, and Table 2, in Example E20, in Example E20, the ratio of the initial discharge capacity to the initial charge capacity (i.e., initial efficiency) is better than that of Comparative Example 1 C20X and Comparative Example 2 C20Y. In addition, Example E20 and Comparative Example 1 C20X may have voltage plateaus at 0.1 V and 0.14 V (that is, plateaus corresponding to peaks at dQ/dV PC1 and PC2) in the charging step, and a voltage plateau (that is, a plateau corresponding to the peaks PD1 and PD2 at dQ/dV) may be obtained at 0.08 V and 0.11 V. in the discharging step. On the other hand, in Comparative Example 2 C20Y, such a voltage plateau may hardly be observed in the discharge step.

Figure 9:
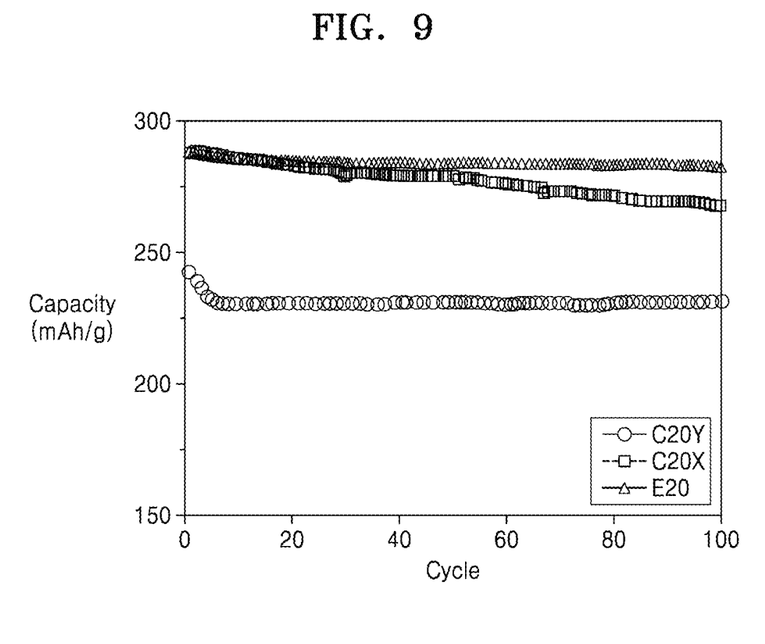
FIG. 9 is a graph showing cycle characteristics of an anode electrode including a carbon composite according to an embodiment.

FIG. 9 is a graph showing cycle characteristics of an anode electrode including a carbon composite according to an embodiment.

Referring to FIG. 9, Example E20 may have a high discharge capacity in an initial cycle and the highest discharge capacity in 100 cycles. For example, when charging and discharging at a current density of 1.0 C, Example E20 may have an initial capacity that is approximately 20% higher than that of 240 mAh/g of Comparative Example 2 C20Y, and shows a discharge capacity of 95.6% compared to the initial capacity after 100 cycles. Therefore, it may be seen that Example E20 has better cycle characteristics compared to 93% of Comparative Example 1 C20X.

Figure 10A:
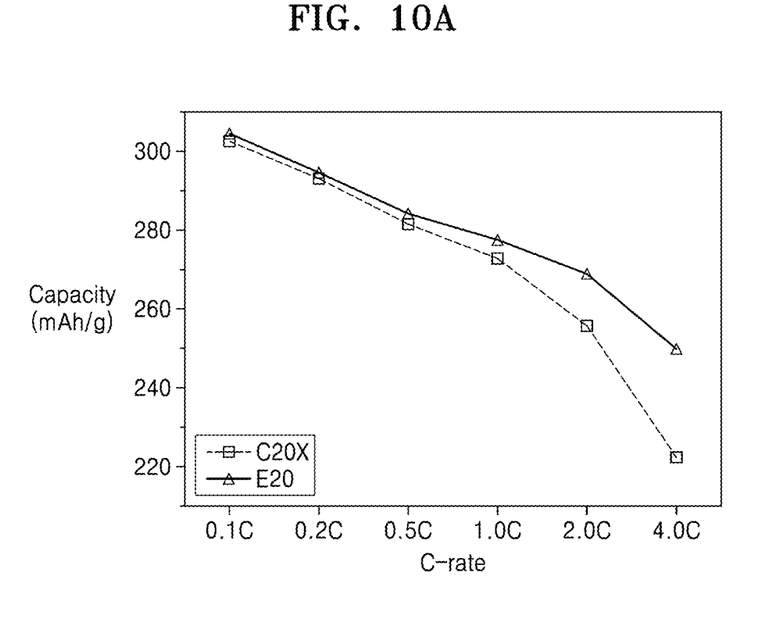
FIG. 10A is a graph showing discharge capacity according to current density of an anode electrode including a carbon composite according to an embodiment.
Figure 10B:
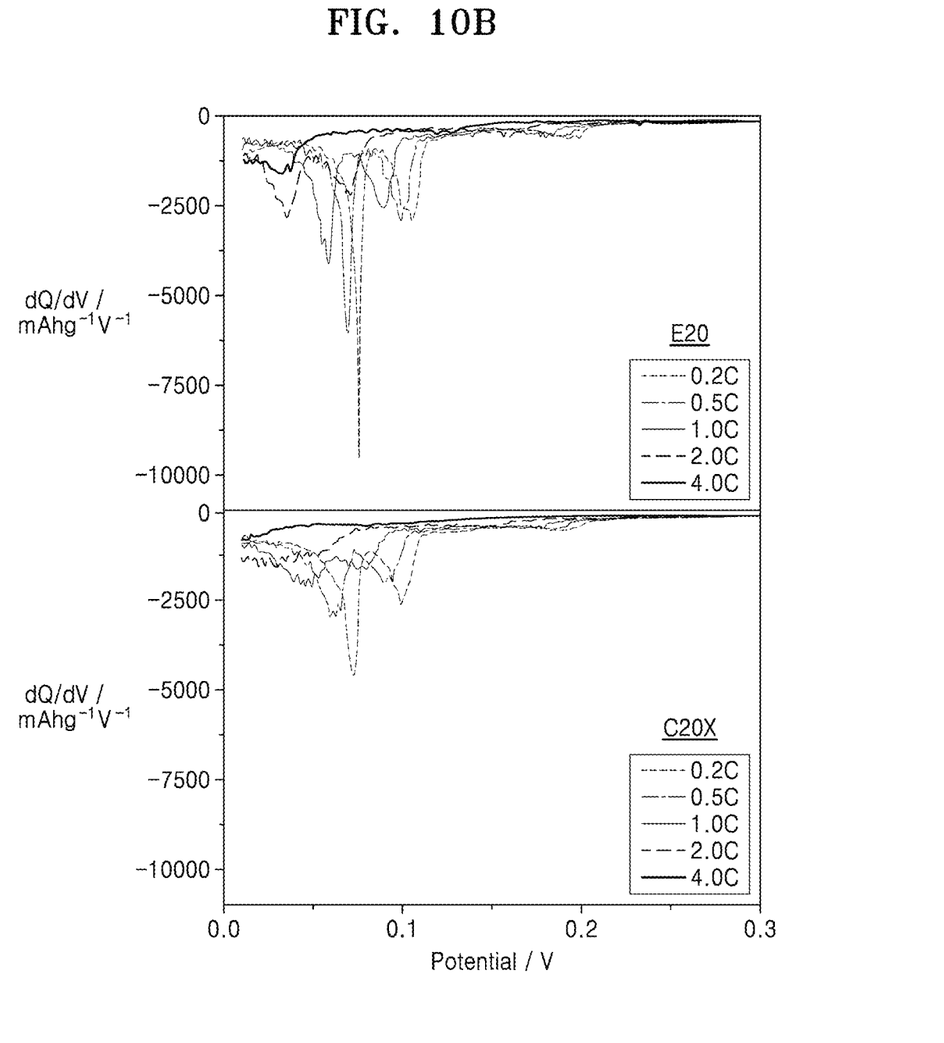
FIG. 10B is a graph showing a dQ/dV plot at each current density of FIG. 10A.
Figure 11A:
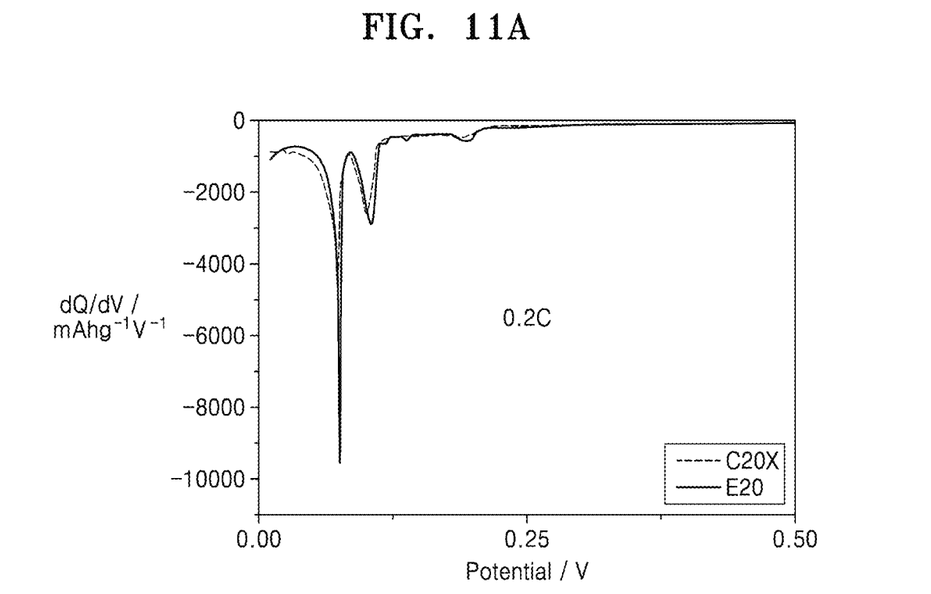
FIG. 11A to 11E are graphs showing an enlarged dQ/dV plot at each current density of FIG. 10B.
Figure 11B:
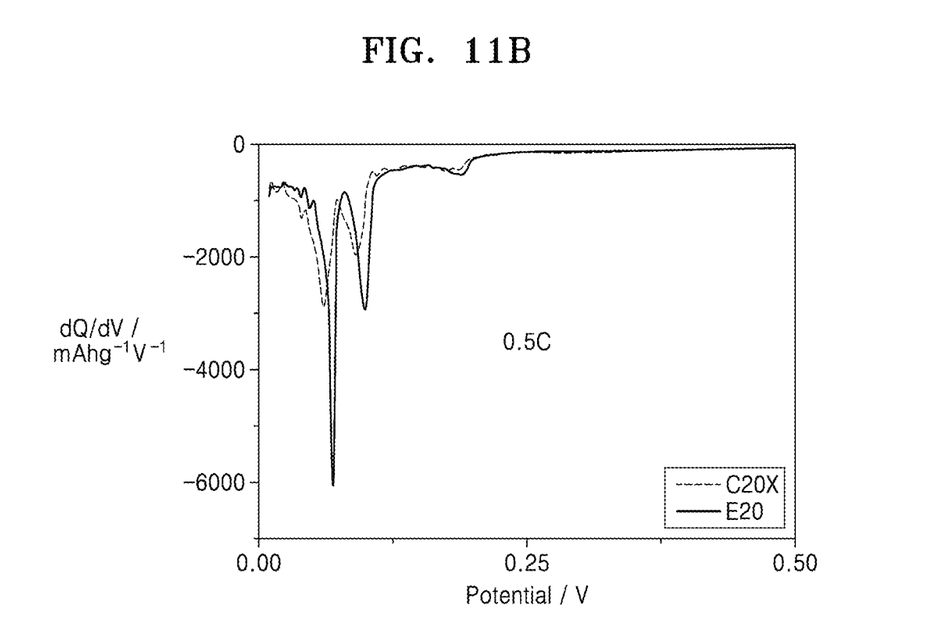
Figure 11C:
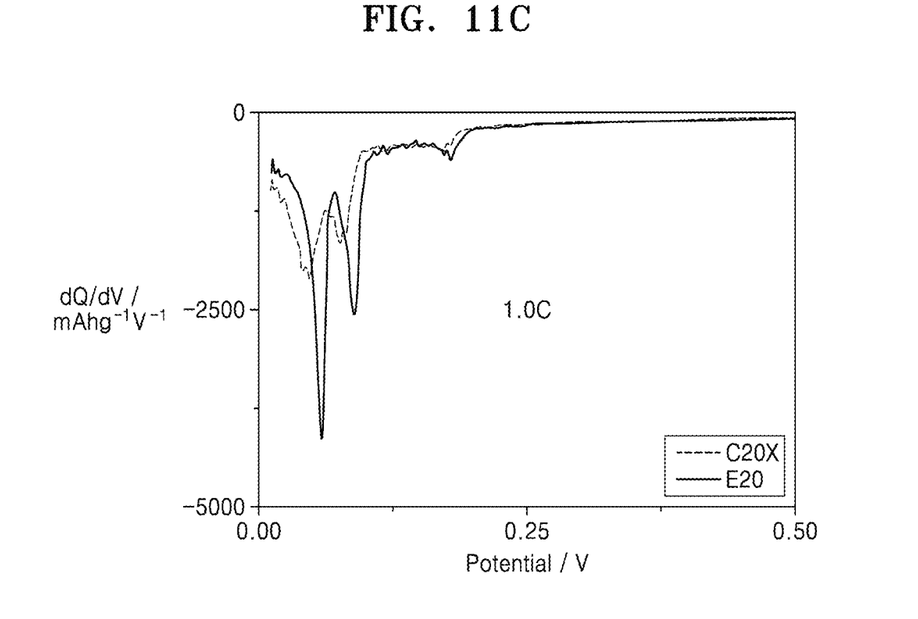
Figure 11D:
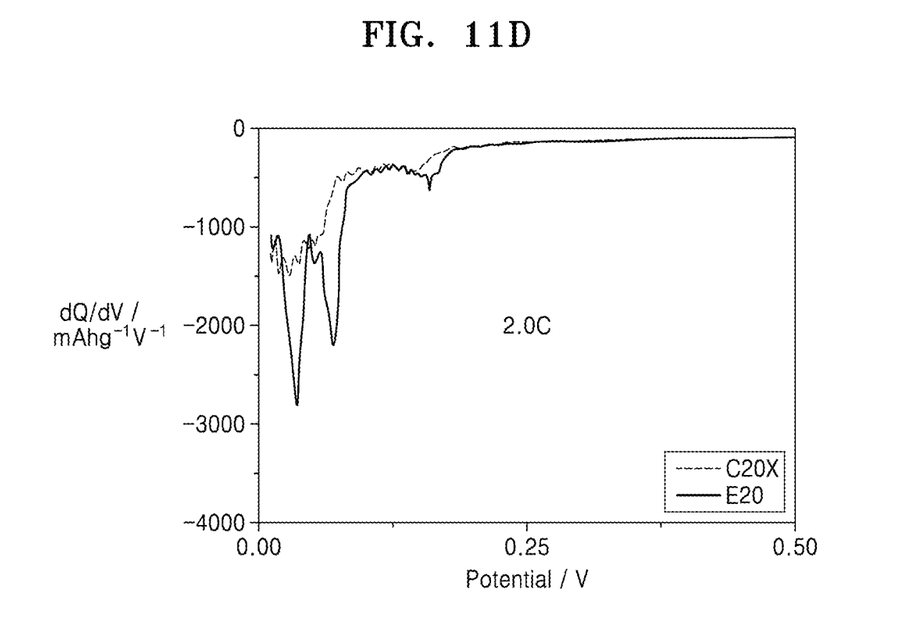
Figure 11E:
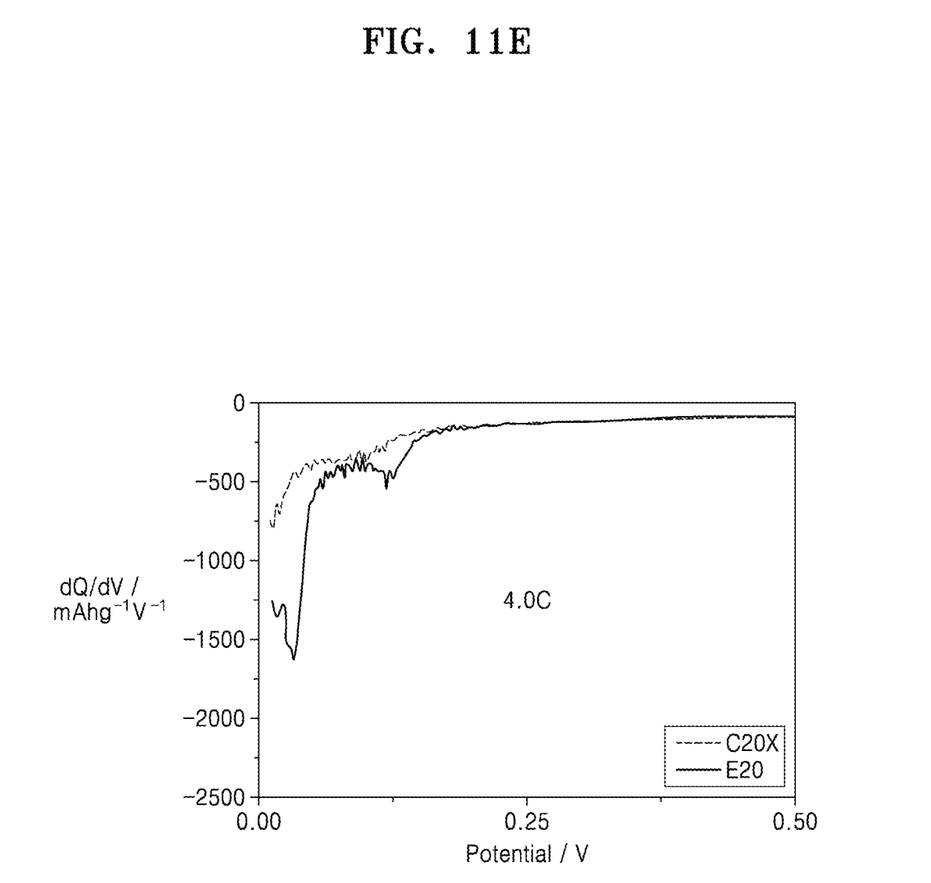

FIG. 10A is a graph showing discharge capacity according to current density of an anode electrode including a carbon composite according to an embodiment, and FIG. 10B is a graph showing a dQ/dV plot at each current density of FIG. 10A. FIG. 11A to 11E are graphs showing an enlarged dQ/dV plot at each current density of FIG. 10B.

Referring to FIGS. 10A to 11E, it may be seen that Example E20 exhibits a higher discharge capacity at a high current density compared to Comparative Example 1 C20X. In particular, when compared with Comparative Example 1 C20X, Example E20 did not show a large difference in discharge capacity at a current density of 0.1 C to 0.5 C, but as the current density increases to 1.0 C, 2.0 C, and 4.0 C, the difference in discharge capacity between Example E20 and Comparative Example 1 C20X may be further increased. For example, it may be seen that at a current density of 4.0 C, Example E20 exhibits a discharge capacity of 240.6 mAh/g, and a significantly higher discharge capacity than Comparative Example 1 C20X of 222.3 mAh/g.

As described above, the anode electrode including the carbon composite according to an embodiment exhibits high discharge capacity, excellent cycle characteristics, and excellent high rate characteristics This may be because the carbon composite 10 according to an embodiment includes graphite particles attached to core particle including amorphous hard carbon at a predetermined angle, and thus, high discharge capacity is obtained by the graphite particles. In addition, this may be because compared to the case where the graphite particles completely surround the core particle, the movement path of lithium ions from the outside of the carbon composite to the core particle may be reduced, and accordingly, even during high-rate charging and high-rate discharge, lithium ions may be delivered to the core particle sufficiently rapidly.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

This research was supported by the Korea Institute of Energy Technology Evaluation and Planning (KETEP) and the Ministry of Trade, Industry & Energy (MOTIE) of the Republic of Korea (No. 20172420108700).

What is claimed is:

1. An anode active material comprising a carbon composite, the carbon composite comprising:
   a core particle including hard carbon; and
   a skin layer placed on a surface of the core particle,
   wherein the skin layer comprises
   graphite particles attached to the surface of the core particle at a predetermined angle with respect to the surface and including graphite-based carbon material; and
   an amorphous carbon layer filling a space between the graphite particles and attaching the graphite particles to the surface of the core particle,
   the carbon composite has a ratio of $I_D$ to $I_G$ in a range of 0.8 to 1.5 ($0.8 \leq I_D/I_G \leq 1.5$) in Raman analysis where $I_D$ is the intensity of D peak at 1300 cm$^{-1}$ to 1400 cm$^{-1}$ and $I_G$ is the intensity of G peak at 1500 cm$^{-1}$ to 1600 cm$^{-1}$, and
   50% by weight or more of the graphite particles based on the total weight of the graphite particles are attached at an angle of 20° to 90° with respect to the surface of the core particle.

2. The anode active material of claim 1, wherein the graphite particles are in direct contact with the surface of the core particle.

3. The anode active material of claim 2, wherein the carbon composite exhibits a surface morphology that is not smooth by the graphite particles.

4. The anode active material of claim 1, wherein based on the weight of the carbon composite, the core particle is included in 30% by weight to 50% by weight, the graphite particles are included in 40% by weight to 60% by weight, and the amorphous carbon layer is included in 10% by weight to 30% by weight.

5. The anode active material of claim 1, wherein the carbon composite has a particle diameter having a median value (D0.5) of about 10 μm to about 30 μm.

6. An anode active material comprising a carbon composite, the carbon composite comprising:
   a core particle including hard carbon;
   a skin layer placed on a surface of the core particle,
   wherein the skin layer comprises
   graphite particles attached to the surface of the core particle and including graphite-based carbon material; and
   an amorphous carbon layer filling a space between the graphite particles and attaching the graphite particles to the surface of the core particle,
   the carbon composite has a ratio of $I_D$ to $I_G$ in a range of 0.8 to 1.5 ($0.8 \leq I_D/I_G \leq 1.5$) in Raman analysis where $I_D$ is the intensity of D peak at 1300 cm$^{-1}$ to 1400 cm$^{-1}$ and $I_G$ is the intensity of G peak at 1500 cm$^{-1}$ to 1600 cm$^{-1}$,
   50% by weight or more of the graphite particles based on the total weight of the graphite particles are attached at an angle of about 20° to about 90° with respect to the surface of the core particle, and
   the graphite particles are in direct contact with the surface of the core particle.

7. The anode active material of claim 6, wherein the carbon composite exhibits a surface morphology that is not smooth by the graphite particles.

8. The anode active material of claim 6, wherein based on the weight of the carbon composite, the core particle is included in 30% by weight to 50% by weight, the graphite particles are included in 40% by weight to 60% by weight, and the amorphous carbon layer is included in 10% by weight to 30% by weight.

9. The anode active material of claim 6, wherein the carbon composite has a particle diameter having a median value (D0.5) of about 10 μm to about 30 μm.

10. The anode active material of claim 6, wherein the carbon composite has a BET specific surface area of about 2 m$^2$/g to about 8 m$^2$/g.

* * * * *